(12) United States Patent  
Neystadt et al.

(10) Patent No.: US 8,607,305 B2  
(45) Date of Patent: Dec. 10, 2013

(54) COLLECTING ANONYMOUS AND TRACEABLE TELEMETRY

(75) Inventors: John Neystadt, Kfar-Saba (IL); Arie Friedman, Petach-Tikva (IL); Gregory Aaron Kohanim, Issaquah, WA (US); Adam Shostack, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1005 days.

(21) Appl. No.: 12/202,352

(22) Filed: Sep. 1, 2008

(65) Prior Publication Data

US 2010/0058454 A1 Mar. 4, 2010

(51) Int. Cl.
*G06F 17/00* (2006.01)
*A61N 1/00* (2006.01)
*H04M 11/04* (2006.01)
*H04M 11/00* (2006.01)

(52) U.S. Cl.
USPC .......... 726/1; 607/60; 455/404.1; 379/106.01

(58) Field of Classification Search
USPC ........ 726/10; 607/60; 455/404.1; 379/106.01
See application file for complete search history.

(56) References Cited

U.S. PATENT DOCUMENTS

| | | | |
|---|---|---|---|
| 6,915,238 B2 | 7/2005 | Watts et al. | |
| 6,996,544 B2 | 2/2006 | Sellars et al. | |
| 7,167,892 B2 | 1/2007 | Defosse et al. | |
| 7,224,713 B2 | 5/2007 | Partyka | |
| 7,228,182 B2 | 6/2007 | Healy et al. | |
| 7,508,941 B1* | 3/2009 | O'Toole et al. | 380/228 |
| 7,805,606 B2* | 9/2010 | Birger et al. | 713/168 |
| 2003/0182577 A1* | 9/2003 | Mocek | 713/201 |
| 2005/0257045 A1 | 11/2005 | Bushman et al. | |
| 2006/0195689 A1 | 8/2006 | Blecken et al. | |
| 2006/0206698 A1* | 9/2006 | Foucher et al. | 713/1 |
| 2006/0224736 A1 | 10/2006 | Graziado et al. | |
| 2007/0087756 A1* | 4/2007 | Hoffberg | 455/450 |
| 2007/0162752 A1 | 7/2007 | Baliga et al. | |
| 2007/0226013 A1 | 9/2007 | Elletson et al. | |
| 2007/0277248 A1 | 11/2007 | Agrawal et al. | |
| 2008/0021833 A1 | 1/2008 | Lau et al. | |
| 2008/0148374 A1* | 6/2008 | Spaur et al. | 726/6 |
| 2008/0310636 A1* | 12/2008 | Bennett | 380/277 |
| 2009/0007217 A1* | 1/2009 | Birger et al. | 726/1 |
| 2009/0249074 A1* | 10/2009 | Madhavan et al. | 713/176 |

OTHER PUBLICATIONS

"Deploying Wi-Fi Asset Tags—Frequently Asked Questions", Retrieved at <<http://www.g2microsystems.com/microsite/pdf/security_q_and_a.pdf>>, pp. 5.

Balasubramanian, et al.,"Secure Key Management for NASA Space Communication ", Retrieved at <<http://gltrs.grc.nasa.gov/reports/2005/CP-2005-213878/06-A4%20-%20Safety%20and%20Security%20Initiatives%20Impacting%20CNS/A4-06-BalasubramanianPaper.pdf>>, pp. 8.

International Search Report and Written Opinion Received for PCT Application No. PCT/US2009/054426, mailed on Mar. 26, 2010, 11 pages.

* cited by examiner

*Primary Examiner* — Techane Gergiso
(74) *Attorney, Agent, or Firm* — Zete Law, P.L.L.C.; MacLane C. Key

(57) ABSTRACT

Aspects of the subject matter described herein relate to collecting anonymous and traceable telemetry. In aspects, a telemetry source may obtain a certificate or other data from an escrow certificate issuer. The certificate includes information usable by a certificate collector to verify that the certificate is valid, but does not include information usable to identify the telemetry source to the telemetry collector.

20 Claims, 5 Drawing Sheets

COLLECTING ANONYMOUS AND TRACEABLE TELEMETRY

BACKGROUND

Telemetry allows acquisition of data at a remote source and transmission of that data to a telemetry collector. The telemetry collector may then aggregate the data and/or perform other calculations on the data for reporting, decision making, software improvement, and the like. Some examples of systems that use telemetry data include software crash dump collection, software quality metrics collection, virus and attack detection statistics, reputation telemetry that includes URLs and IP addresses associated with attackers, and the like.

Telemetry data may be provided by low quality source or may even be provided by a source that purposefully sends false data. One approach to avoid low quality and false data is to request information that identifies or authenticates the source of the data. Data that comes from sources that are known to be of low or questionable quality may then be discarded.

Enterprises and individuals, however, dislike identifying themselves when sending telemetry data due to concerns about disclosing sensitive private information. As a result, such enterprises and individuals may opt out of or not op into sending telemetry data.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to collecting anonymous and traceable telemetry. In aspects, an escrow mechanism is disclosed that issues certificates or other data that does not disclose the telemetry source but that distinguishes the telemetry source from other sources. A telemetry source may obtain a certificate or other data from an escrow certificate issuer. A telemetry collector may verify that the certificate is valid or that telemetry data has been sent by an authenticated telemetry source, but may not discover the identity of the telemetry source without additional information not included in the certificate or other data. This arrangement allows entities to feel confident in providing telemetry data without worrying that the telemetry data will be used to identify them. At the same time, telemetry collectors can use the data to assist with obtaining reliable telemetry data.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. Other definitions, explicit and implicit, may be included below.

Exemplary Operating Environment

Figure 1:
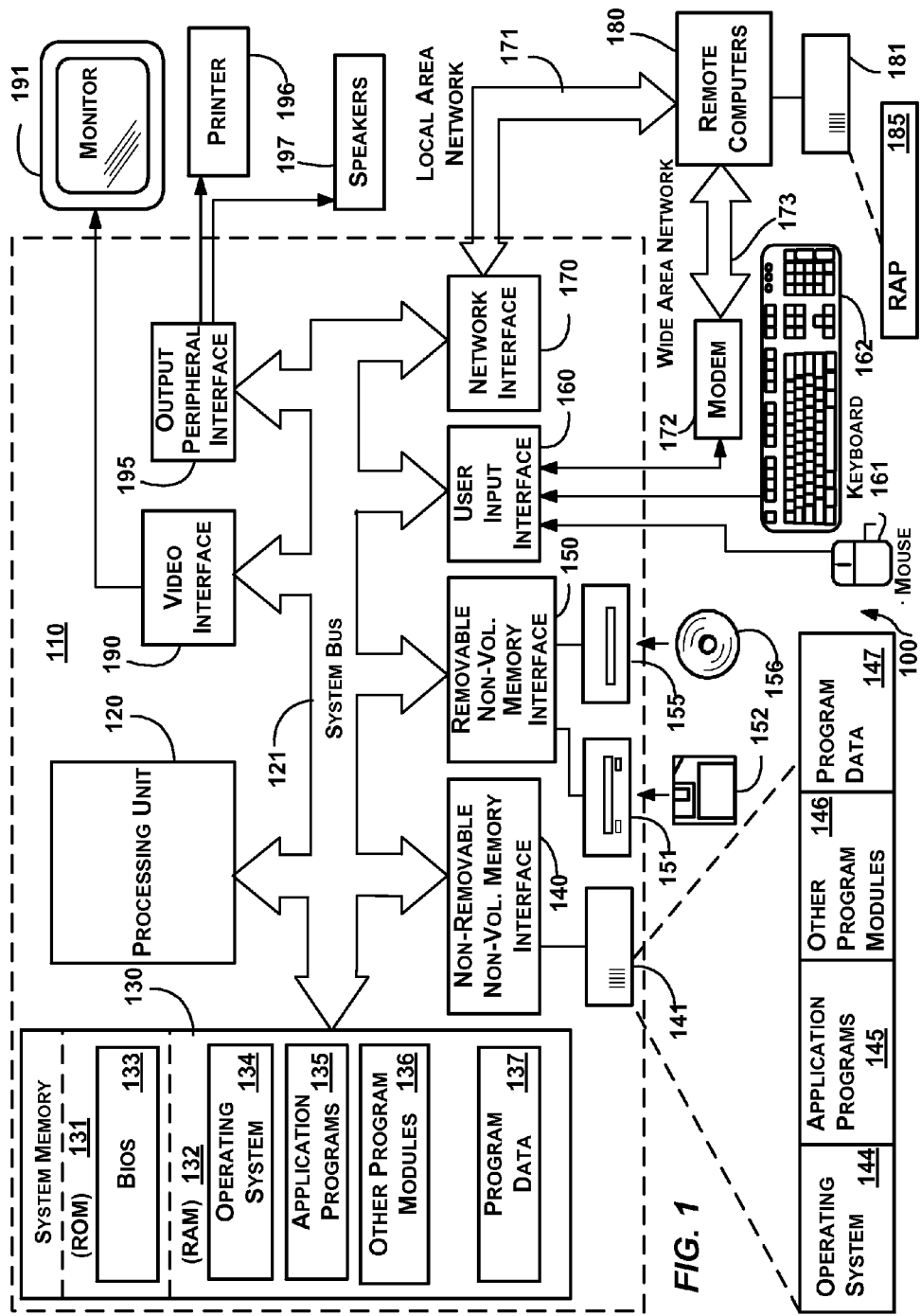
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 20 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Collecting Telemetry

As mentioned previously, telemetry data may be used for reporting, decision making, software improvement, and the like. Obtaining quality telemetry data, however, is challenging in part because many entities that might potentially provide the telemetry data would not opt-in or rather opt-out of sending the telemetry data than provide information that may be used to trace the telemetry data to the entity providing the telemetry data.

Telemetry data may be obtained automatically (e.g., without user interaction), manually (e.g., with user input), or in some combination of automatically and manually (e.g., some telemetry data may be obtained automatically while other telemetry data may be obtained via user input). The term "telemetry data" is to be read broadly to include any data that may be collected by a computer and sent via a transmission medium. Some examples of telemetry data have been described previously, but it is not intended that these examples of telemetry data are exhaustive or all-inclusive. Indeed, based on the teachings herein, those skilled in the art may recognize many other examples of telemetry data that may benefit from the teachings herein without departing from the spirit or scope of aspects of the subject matter described herein.

Figure 2:
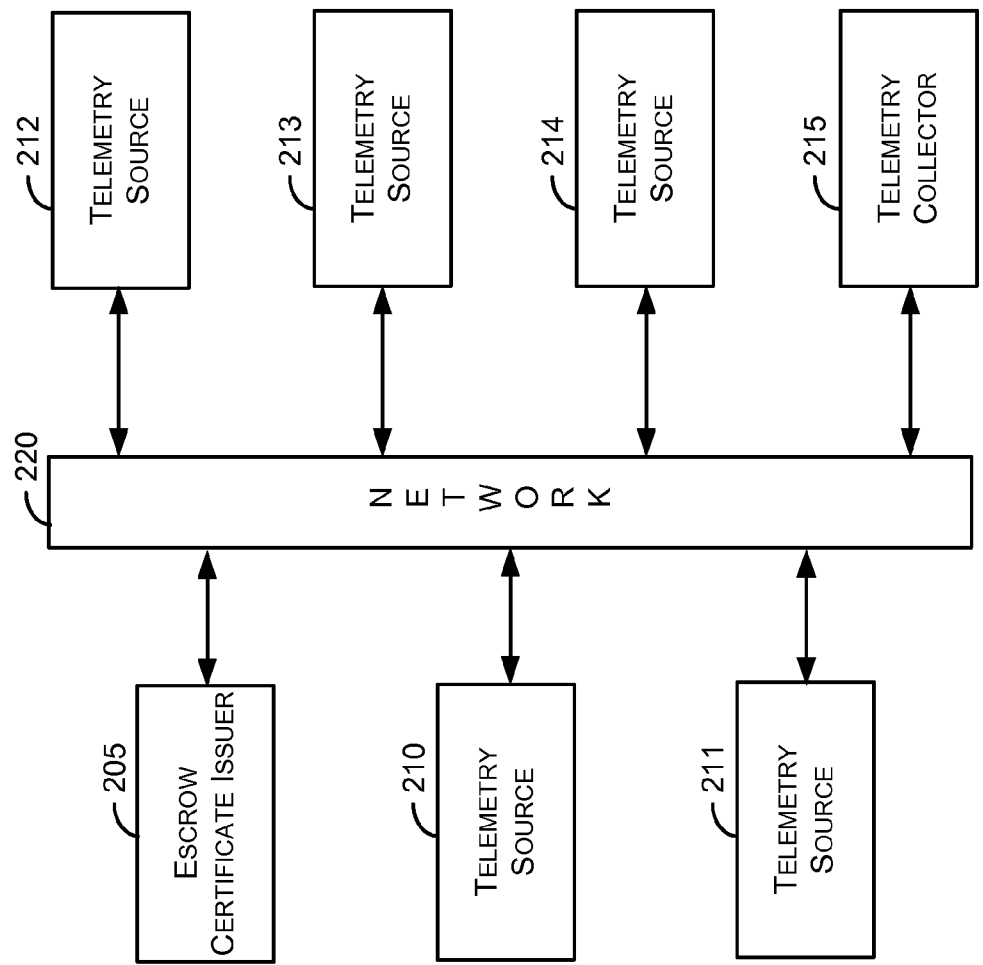
FIG. 2 is a block diagram representing an exemplary environment in which aspects of the subject matter described herein may be implemented.

FIG. 2 is a block diagram representing an exemplary environment in which aspects of the subject matter described herein may be implemented. The environment may include an escrow certificate issuer 205, one or more telemetry sources 210-214, a telemetry collector 215, a network 220, and may include other entities (not shown). The various entities may be located relatively close to each other or may be distributed across the world. The various entities may communicate with each other via various networks including intra- and inter-office networks and the network 220.

Each of the escrow certificate issuer 205, the telemetry sources 210-214, and the telemetry collector 215 may be implemented as components on one or more computers (e.g., the computer 110 described in conjunction with FIG. 1). As used herein, the term component is to be read to include all or a portion of a device, one or more software components executing on one or more devices, some combination of one or more software components and one or more devices, and the like.

In some embodiments, one or more of the entities described above may reside at the same site or on a single computer. For example, the escrow certificate issuer 205 and the telemetry collector 215 may be collocated at a particular site.

The escrow certificate issuer 205 is an entity that generates certificates or other data that may be used in conjunction with sending and/or receiving telemetry data. In one embodiment, the escrow certificate issuer 205 may generate a certificate and provide the certificate to a telemetry source seeking the certificate. The certificate or other data includes information that can be used to verify that the escrow certificate issuer 205 issued the certificate. This can be done for example by signing the identifier with a certificate issuer key known to the telemetry collector. The certificate or other data does not include the identity of the sending entity. Instead, the certificate includes an identifier such as a number, string, or the like. The identifier does not identify the sending entity to an entity receiving telemetry data.

The escrow certificate issuer 205 may include information that identifies an entity that sends telemetry information. For example, the escrow certificate issuer 205 may include the entity's name and contact information. Furthermore, the escrow certificate issuer 205 may be able to identify a particular entity based on a certificate.

To avoid using the information on the escrow certificate issuer 205, however, for identifying an entity sending telemetry data, the escrow certificate issuer 205 may be operated by a company that is independent of the company that operates the telemetry collector 215. Alternatively, or in addition, legal guarantees can be made that ensure that the information on the escrow certificate issuer 205 is not used to obtain identifying information for entities that send telemetry data.

In one embodiment, the escrow certificate issuer 205 and the telemetry collector 215 may be controlled by the same company with legal guarantees that the information included on the escrow certificate issuer 205 will not be used to identify an entity sending telemetry data.

In one embodiment, the escrow certificate issuer 205 may provide a private key to the entity requesting the certificate. When the entity sends telemetry data, the entity may sign the telemetry data using the private key.

The certificate may also include other information including an identifier associated with the entity requesting the certificate usable by a telemetry collector to distinguish the telemetry sender from other telemetry senders but not usable to identify the telemetry sender, a version of the certificate, a validity period, a public key corresponding to the private key used to sign telemetry data by the sending entity, information about the escrow certificate issuer, other data, and the like.

When the telemetry collector 215 receives telemetry data, the telemetry collector 215 verifies that the telemetry data was signed by an entity having a valid certificate that was issued by the escrow certificate issuer 205. This verification may follow common public key infrastructure (PKI) rules including validating the chain of trust, determining that the certificate has not been revoked or expired, and so forth. As the certificate does not include information that identifies the sending entity to the telemetry collector 215, the entity sending the telemetry data is anonymous to the telemetry collector 215.

In another embodiment, an entity that seeks a certificate from the escrow certificate issuer 205 may be provided with an authentication code instead of the public/private key mechanism described previously. An authentication code is data that a telemetry source can use to provide evidence that the telemetry source has communicated with the escrow certificate issuer 205 and has received the authentication code from the escrow certificate issuer 205. In one embodiment, an authentication code may comprise a number, a string, a sequence of bits or bytes, a combination of the above, or the like. In an embodiment, an authentication code may be used as a symmetric key and may be used to generate a hash value that may be used to authenticate that telemetry data was sent by a valid telemetry source. An authentication code may be used to anonymously authenticate and/or create a secure channel (e.g., encrypted) between a telemetry source and a telemetry collector.

When a telemetry source sends telemetry data, the telemetry source may send the authentication code to the telemetry collector 215 (e.g., over a secure channel), produce a hash of the telemetry data using the authentication code and send the hash to the telemetry collector 215, or otherwise use the authentication code to indicate that the telemetry data comes from a source that has the authentication code. To verify that telemetry data comes from an authorized telemetry source, the telemetry collector 215 may obtain a list of valid authentication codes from the escrow certificate issuer 205 but may not have information that associates an authentication code with a particular entity. In conjunction with receiving telemetry data from a telemetry source, the telemetry collector 215 may receive the authentication code (or evidence that the telemetry source has the authentication code) and may verify the authentication code with its list of valid authentication codes. If the authentication code is valid and the telemetry source is deemed reliable (as described below), the telemetry collector 215 may also receive (and not reject or discard) the telemetry data.

With the anonymity provided by the mechanism above, an entity sending telemetry data can feel confidence that their sensitive information stays secure and may thereby be encouraged to opt-in or not opt-out of sending the telemetry data.

In case that the telemetry collector 215 determines that the source of the telemetry data is unreliable or is providing false telemetry data, the telemetry collector 215 may decide to ignore all further telemetry data signed with a certificate having the particular identifier. In one embodiment, the telemetry collector 215 may store a list of identifiers included in certificates together with an indication of quality of data associated with each identifier. In another embodiment, the telemetry collector 215 may store a list of identifiers for certificates that are deemed to send unreliable or false telemetry data and may use this list to ignore telemetry data sent by entities using the certificates. When more than one telemetry collector is involved in collecting telemetry data, the telemetry collectors may share rankings of the reliability of data provided by entities associated with certificates or other identifiers.

A sophisticated attacker may attempt to obtain multiple different certificates for sending rogue information. To counter this attack, a cost associated with acquiring new certificate from the escrow certificate issuer 205 may be introduced. The cost may be monetary or may involve performing a set of manual actions, for example. The cost may be calculated to be low enough to balance the need to get potential telemetry sources to opt-in, but high enough to represent a barrier to prevent mass automatic obtaining of the certificates.

As another barrier to obtaining multiple certificates, the escrow certificate issuer 205 may take actions to verify the identity of the entity seeking a certificate. Such actions may include, for example, using government bureaus, leveraging payment infrastructure, using human verification, verification of address, using third party databases and services, using heuristics, and the like.

The entity sending telemetry data may sign the data using the private key and send the certificate with the telemetry data. The telemetry collector 215 receiving the telemetry data may verify that the data has been validly signed by using data in the certificate. For example, the telemetry collector 215 may verify that the certificate was signed by the escrow certificate issuer 205 using a public key of the escrow certificate issuer 205. Furthermore, the telemetry collector 215 may verify a signature of a telemetry source associated with the telemetry data by using a public key included in the certificate. Verifying signatures may involve using hashes as is known by those skilled in the art.

Although the environment described above includes an escrow certificate issuer 205, five telemetry sources 210-214, and a telemetry collector 215, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
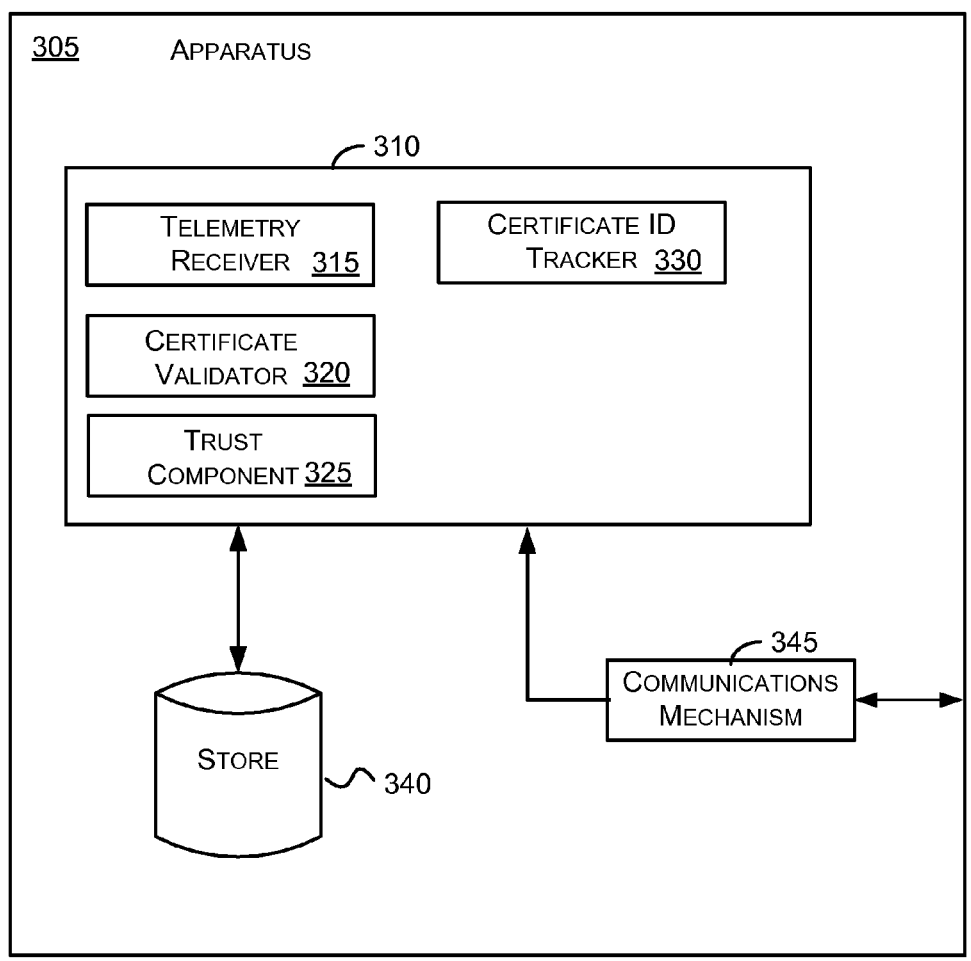
FIG. 3 is a block diagram that represents components of an exemplary system configured in accordance with aspects of the subject matter described herein.

FIG. 3 is a block diagram that represents components of an exemplary system configured in accordance with aspects of the subject matter described herein. The components illustrated in FIG. 3 are exemplary and are not meant to be all-inclusive of components that may be needed or included. In other embodiments, the components and/or functions described in conjunction with FIG. 3 may be included in other components (shown or not shown) or placed in subcomponents without departing from the spirit or scope of aspects of the subject matter described herein. In some embodiments, the components and/or functions described in conjunction with FIG. 3 may be distributed across multiple devices (e.g., two or more of the entities illustrated in FIG. 2).

Turning to FIG. 3, the apparatus 305 may include a telemetry collector 310, a store 340, and a communications mechanism 345. The telemetry collector 310 may include a telemetry receiver 315, a certificate validator 320, a trust component 325, and a certificate ID tracker 330. The telemetry collector 310 may correspond to the telemetry collector 215 of FIG. 2.

The communications mechanism 345 allows the apparatus 305 to communicate with other entities shown in FIG. 2. The communications mechanism 345 may be a network interface or adapter 170, modem 172, or any other mechanism for establishing communications as described in conjunction with FIG. 1.

The store 340 is any storage media capable of storing data. The term data is to be read to include information, program code, program state, program data, telemetry and telemetry-related data, other data, and the like. The store 340 may comprise a file system, database, volatile memory such as RAM, other storage, some combination of the above, and the like and may be distributed across multiple devices. The store 340 may be external, internal, or include components that are both internal and external to the apparatus 305.

The telemetry receiver 315 is operable to receive telemetry data in conjunction with a certificate. As previously mentioned, the certificate includes information usable to verify that the certificate is issued by an escrow certificate issuer but not usable to determine an identity of an entity that sent the telemetry data without additional data not included in the certificate. An example of such information is a number or other sequence of bytes that distinguishes the certificate from other certificates but that does not identify the entity associated with the certificate without additional information.

The certificate validator 320 is operable to verify that the certificate was issued by the escrow certificate issuer. This may involve, for example, verifying that a signature included in the certificate is from the escrow certificate issuer which may involve using a public key associated with the escrow certificate issuer.

The trust component 325 is operable to establish a trust relationship with the escrow certificate issuer. In this context, a "trust relationship" may involve obtaining a public key or other information that may be used to determine whether a certificate was issued by the escrow certificate issuer. In one example, establishing a trust relationship may involve exchanging symmetric keys that may be used to verify that telemetry data has been sent by a valid telemetry source. In another example, establishing a trust relationship may involve obtaining a list of valid authentication codes. A "trust relationship" may also involve other PKI mechanisms as will be understood by those skilled in the art.

The certificate ID tracker 330 may be operable to track the reliability of telemetry data received in conjunction with various certificates. As each certificate includes an identifier that distinguishes it from other certificates, this identifier may be used when rejecting or discarding telemetry data from an unreliable source. Tracking data may be stored in the store 340.

Figure 4:
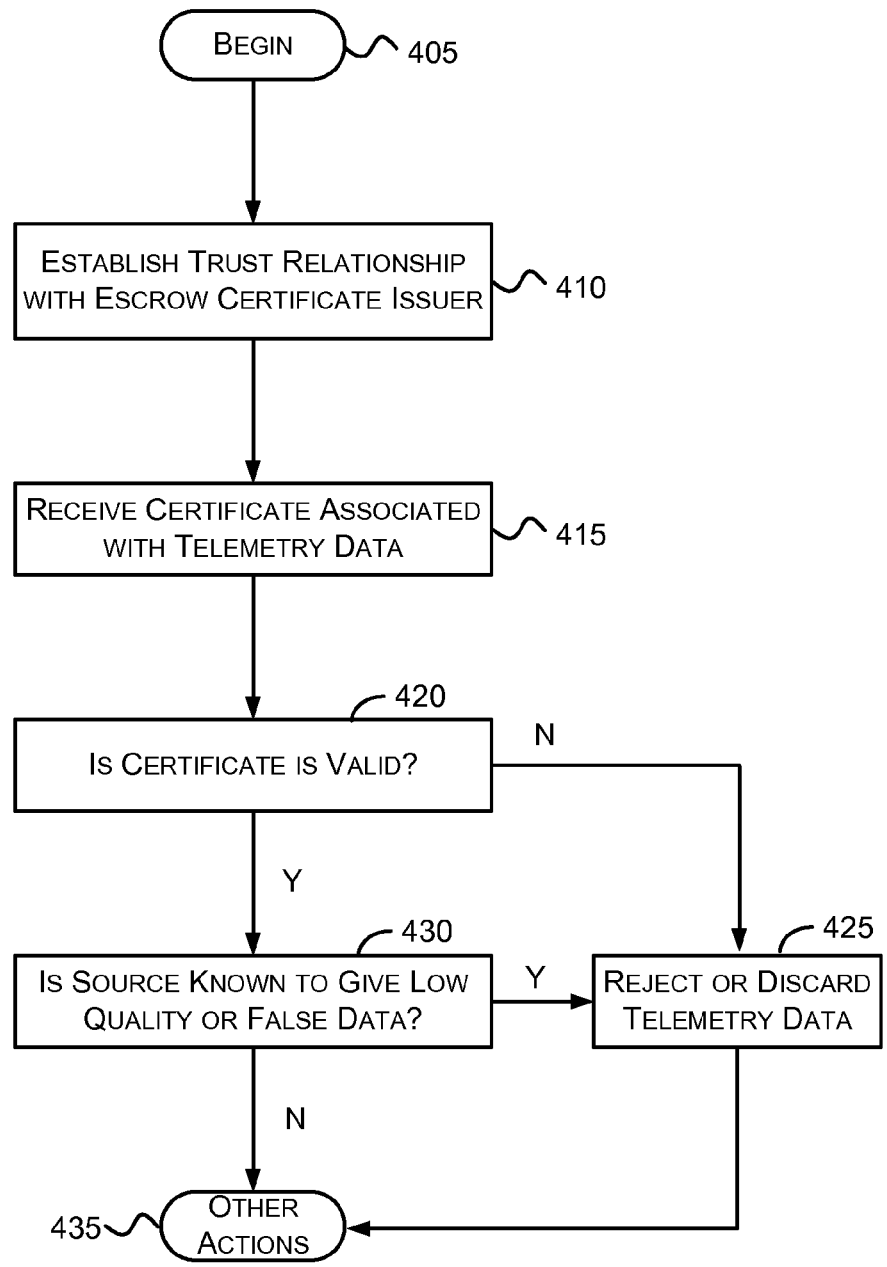
FIGS. 4-5 are flow diagrams that general represent actions that may occur in accordance with aspects of the subject matter described herein.
Figure 5:
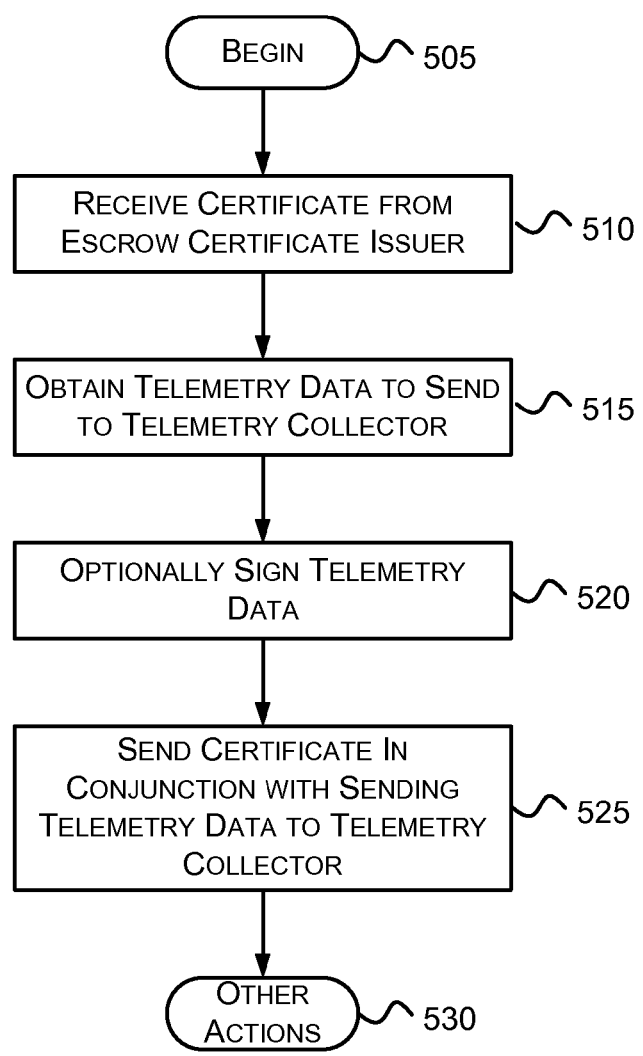

FIGS. 4-5 are flow diagrams that general represent actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 4, at block 405, the actions begin. At block 410, a trust relationship is established with an escrow certificate issuer. For example, referring to FIG. 2, the telemetry collector 215 establishes a trust relationship with the escrow certificate issuer 205. As indicated previously, the escrow certificate issuer 205 issues certificates to entities that indicate a willingness to provide telemetry data. In one embodiment, establishing a trust relationship with the escrow certificate issuer 205 may comprise obtaining a public key that corresponds to a private key with which the escrow certificate issuer 205 signs certificates. In another embodiment, establishing a trust relationship with the escrow certificate issuer 205 may comprise obtaining valid authentication codes from the escrow certificate issuer 205.

At block 415, a certificate associated with telemetry data is received from a telemetry source. For example, referring to FIG. 2, the telemetry collector 215 may receive a certificate from the telemetry source 210. The telemetry source 210 may have previously obtained this certificate from the escrow certificate issuer 205. As described previously, the certificate includes information that is usable to verify that the certificate is valid but is not usable to determine an entity that controls the telemetry source without additional data not included in the certificate.

At block 420, a determination is made as to whether the certificate is valid. If so, the actions continue at block 430; otherwise, the actions continue at block 425. For example, referring to FIG. 3, the certificate validator 320 validates the received certificate. Valid, as used here, indicates that the certificate was issued from a trusted escrow certificate issuer, that the certificate has not expired, and that the certificate has not been revoked.

At block 425, the telemetry data associated with the certificate is rejected or discarded as appropriate. For example, referring to FIG. 3, if the certificate validator 320 determines that the certificate is not valid, the telemetry receiver 315 may reject or discard any incoming telemetry data associated with the certificate.

At block 430, a determination is made as to whether the source associated with the certificate is known to give low quality or false data. If so, the actions continue at block 425; otherwise, the actions continue at block 435. For example, referring to FIG. 3, the certificate ID tracker 330 determines whether the certificate is associated with a low quality or known false quality source.

At block 435, other actions, if any occur. Other actions may include, for example, receiving the telemetry data and storing it, determining the reliability of a telemetry source, providing feedback to telemetry data, and so forth.

Turning to FIG. 5, at block 505, the actions begin. At block 510, a certificate is received from an escrow certificate issuer. For example, referring to FIG. 2, a telemetry source (e.g., one of the telemetry sources 210-214) may obtain a certificate from the escrow certificate issuer 205. This certificate may be embodied in first data that is usable to verify that telemetry data sent to a telemetry receiver is sent by an entity that has access to the certificate. By providing an identifier that does not identify the telemetry source to the telemetry collector, the certificate provides anonymity to the entity with respect to the telemetry receiver.

At block 515, telemetry data is obtained to send to a telemetry collector. For example, referring to FIG. 2, a telemetry source obtains telemetry data to send to the telemetry collector 215.

At block 520, the telemetry data is optionally signed. In embodiments where a signature accompanies the telemetry data to the telemetry collector, the telemetry source may sign the telemetry data using a private key corresponding to a public key included in the certificate. In embodiments where the telemetry source uses an authentication code to provide telemetry data to the telemetry collector, the telemetry source may send the authentication code to the telemetry collector over a secure channel, send a hash of the telemetry data together with the telemetry data, or use the authentication code in another way to indicate that that the telemetry source has possession of the authentication code.

At block 525, the certificate is sent in conjunction with sending telemetry data to the telemetry collector. For example, referring to FIG. 2, a telemetry source sends a certification in conjunction with sending telemetry data to the telemetry collector 215.

At block 530, other actions, if any, may occur. For example, the telemetry source may receive an acknowledgment of receipt of the telemetry data, information that assists the telemetry source to correct an error associated with the telemetry data, other data, or the like.

As can be seen from the foregoing detailed description, aspects have been described related to collecting anonymous and traceable telemetry. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:

establishing a trust relationship with an escrow certificate issuer operable to issue certificates for use in providing telemetry data, the telemetry data including attack detection data;

receiving a certificate from a telemetry source, the certificate including information usable to verify that the certificate is valid but not usable to determine an entity that controls the telemetry source without additional data not included in the certificate;

determining, by a processor, whether the certificate is valid; and when the certificate is valid, determining whether the certificate is associated with low quality telemetry data or known false quality telemetry data and, when the certificate is associated with low quality telemetry data or known false quality telemetry data, causing the telemetry data to be rejected.

2. The method of claim 1, wherein determining whether the certificate is valid comprises determining whether the escrow certificate issuer issued the certificate.

3. The method of claim 1, wherein determining whether the certificate is valid comprises determining whether the certificate has expired.

4. The method of claim 1, wherein determining whether the certificate is valid comprises determining whether the certificate has been revoked.

5. The method of claim 1, wherein establishing a trust relationship with the escrow certificate issuer comprises obtaining a public key that corresponds to private key with which the escrow certificate issuer signs the certificates.

6. The method of claim 1, further comprising establishing a cost to issuing certificates to discourage entities that seek to automatically obtain multiple certificates.

7. The method of claim 1, wherein the information includes a public key of the telemetry source, the public key corresponding to a private key used to sign the telemetry data.

8. The method of claim 1, wherein the information includes a sequence of bytes that distinguishes the telemetry source from other telemetry sources to which the escrow certificate issuer has issued certificates.

9. The method of claim 1, further comprising determining whether the telemetry source is reliable based at least in part on previous telemetry data sent with the certificate.

10. A computer storage medium, the computer storage medium not consisting of a signal per se, storing computer-executable instructions, which when executed perform actions, comprising:

receiving first data from an escrow certificate issuer, the first data usable to verify that telemetry data sent to a telemetry receiver is sent by an entity that has access to the first data, the first data providing anonymity to the entity with respect to the telemetry receiver, the telemetry data including attack detection data; and in conjunction with sending telemetry data to the telemetry receiver from a telemetry source, using the first data to indicate that the telemetry data is sent by the entity that has access to the first data, and determining whether the first data is associated with low quality telemetry data or known false quality telemetry data and, when the first data is associated with low quality telemetry data or known false quality telemetry data, indicating the telemetry data sent to the telemetry receiver should be discarded or rejected.

11. The computer storage medium of claim 10, wherein the first data providing anonymity to the entity with respect to the telemetry receiver comprises the first data not including information usable to determine an identity of the entity without additional data that is not included in the first data.

12. The computer storage medium of claim 10, wherein the first data comprises a certificate that includes an identifier that is different from any other identifier that the escrow certificate issuer provides in a certificate to any other entity.

13. The computer storage medium of claim 12, wherein the identifier comprises a sequence of bits.

14. The computer storage medium of claim 10, wherein the first data comprises an authentication code.

15. The computer storage medium of claim 10, wherein the first data comprises a certificate that includes a public key usable to verify that the certificate was issued by the escrow certificate issuer.

16. The computer storage medium of claim 10, further comprising signing the telemetry data using a private key that corresponds to a public key included in the first data.

17. In a computing environment, an apparatus, comprising:
one or more hardware elements, the one or more hardware elements including a processor;
a telemetry receiver operable with the processor to receive from a telemetry source telemetry data in conjunction with a certificate, the certificate including information usable to verify that the certificate is issued by an escrow certificate issuer but not usable to determine an identity of an entity that sent the telemetry data without additional data not included in the certificate, the telemetry data including attack detection data;
a certificate validator operable to verify that the certificate was issued by the escrow certificate issuer;
a ranking unit operable to generate a reliability rank of the telemetry source; and
a transmitter configured to transmit the reliability rank of the telemetry source to a telemetry collector, the reliability rank indicating the telemetry source is associated with low quality telemetry data and the telemetry data should be discarded by the telemetry collector.

18. The apparatus of claim 17, further comprising a certificate identifier tracker operable to store information that identifies the certificate, the information usable to track reliability of telemetry data received in conjunction with the certificate.

19. The apparatus of claim 17, further comprising a trust component operable to establish a trust relationship with the escrow certificate issuer, the trust relationship providing information usable to determine whether a certificate was issued by the escrow certificate issuer.

20. The apparatus of claim 17, wherein the information usable to verify that the certificate is issued by the escrow certificate issuer comprises a signature of the escrow certificate issuer and a public key corresponding to a private key with which the escrow certificate issuer signs certificates.

* * * * *